(12) United States Patent
Kim

(10) Patent No.: US 11,840,193 B2
(45) Date of Patent: Dec. 12, 2023

(54) APPARATUS FOR ADJUSTING HEIGHT OF SEAT BELT

(71) Applicants: Hyundai Motor Company, Seoul (KR); Kia Corporation, Seoul (KR)

(72) Inventor: Young Rok Kim, Whasung-Si (KR)

(73) Assignees: Hyundai Motor Company, Seoul (JP); Kia Corporation, Seoul (KR)

( * ) Notice: Subject to any disclaimer, the term of this patent is extended or adjusted under 35 U.S.C. 154(b) by 37 days.

(21) Appl. No.: 17/697,662

(22) Filed: Mar. 17, 2022

(65) Prior Publication Data
US 2023/0015173 A1 Jan. 19, 2023

(30) Foreign Application Priority Data
Jul. 13, 2021 (KR) .......... 10-2021-0091732

(51) Int. Cl.
*B60R 22/20* (2006.01)
*B60R 22/26* (2006.01)

(52) U.S. Cl.
CPC ........... *B60R 22/201* (2013.01); *B60R 22/26* (2013.01); *B60R 2022/266* (2013.01)

(58) Field of Classification Search
CPC ..... B60R 22/26; B60R 22/201; B60R 22/205; B60R 22/202; B60R 22/105; B60R 22/22; B60R 2022/266; B60N 2/2803; B60N 2002/2818
See application file for complete search history.

(56) References Cited

U.S. PATENT DOCUMENTS

| | | | | |
|---|---|---|---|---|
| 5,265,908 A * | 11/1993 | Verellen | ............... | B60R 22/205 297/483 |
| 5,971,490 A * | 10/1999 | Chang | ............... | B60N 2/0715 297/483 |
| 6,145,881 A * | 11/2000 | Miller, III | ............... | B60R 22/20 280/808 |
| 6,749,223 B2 * | 6/2004 | Kazuo | ............... | B60R 22/20 297/483 |
| 7,513,531 B2 * | 4/2009 | Gray | ............... | B60R 22/202 297/483 |
| 8,002,358 B2 * | 8/2011 | Marriott | ............... | B60R 22/201 280/808 |
| 8,807,658 B2 * | 8/2014 | Ott | ............... | B60R 22/26 297/483 |
| 9,682,682 B2 * | 6/2017 | Aoki | ............... | B60R 22/26 |
| 2008/0136141 A1 * | 6/2008 | Gray | ............... | B60R 22/202 280/727 |

FOREIGN PATENT DOCUMENTS

| KR | 10-1730613 | | 4/2017 | |
|---|---|---|---|---|
| KR | 20220141997 A | * | 10/2022 | ............. B60R 22/26 |

* cited by examiner

*Primary Examiner* — Paul N Dickson
*Assistant Examiner* — Caitlin Anne Miller
(74) *Attorney, Agent, or Firm* — MORGAN, LEWIS & BOCKIUS LLP

(57) ABSTRACT

An apparatus of adjusting the height of a seat belt, which enables the height of a three-point-type seat belt to be adjusted according to the body shape of a child passenger, securing the safety of a child passenger as well as an adult passenger, includes a sliding rail vertically provided on a side of a seatback; and a slider including a belt ring to hang a shoulder belt, wherein the slider is engaged to the sliding rail and configured to vertically slide along the sliding rail, the belt ring being positioned on a top portion of the seatback in a state in which the slider is positioned on an upper end portion of the sliding rail.

15 Claims, 15 Drawing Sheets

APPARATUS FOR ADJUSTING HEIGHT OF SEAT BELT

CROSS-REFERENCE TO RELATED APPLICATION

The present application claims priority to Korean Patent Application No. 10-2021-0091732, filed on Jul. 13, 2021, the entire contents of which is incorporated herein for all purposes by this reference.

BACKGROUND OF THE PRESENT DISCLOSURE

Field of the Present Disclosure

The present disclosure relates to an apparatus of adjusting the height of a seat belt, which enables the height of a three-point-type seat belt to be adjusted according to the body shape of a child passenger, securing the safety of a child passenger as well as an adult passenger.

Description of Related Art

School vehicles carrying children need to install a seat belt which is adjustable to suit to the body shape of children.

However, a two-point-type seat belt is currently applied to most school vehicles, and this is the reason of increasing the risk of injury in the event of an accident.

Because of this, the use of an existing three-point-type seat belt is being devised, and representative examples thereof may include a clip-on seat belt and a booster-type seat belt.

In the clip-on seat belt, a clip is fastened to a portion of the existing three-point-type seat belt where a shoulder belt is typically hung. Accordingly, the clip functions to lower the height of the portion where the shoulder belt is hung, and the resulting seat belt may be tailored to suit to the body shape of children.

Using the clip enables the seat belt to be available for both adults and children, but there is no clear standard for the fastening strength of the clip and thus, the safety of a child passenger cannot be guaranteed in the event of an accident.

In the booster-type seat belt, a seat cushion is folded up in use to suit to a small passenger. This has an advantage of being easy to use.

However, in the case of a seat arrangement in which a center seat is placed between left and right seats, the booster-type seat belt is applicable to the left and right seats, but is not easily installed to the center seat. Furthermore, the booster-type seat belt has difficulty in multi-stage adjustment according to the body shape of a passenger.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of adjusting the height of a seat belt, which enables the height of a three-point-type seat belt to be adjusted according to the body shape of a child passenger, securing the safety of a child passenger as well as an adult passenger.

Another aspect of the present disclosure is to provide an apparatus of adjusting the height of a seat belt, which may adjust the height of a seat belt for multi-functional seats (e.g., removable-type, swivel-type, and long-sliding-type seats) of autonomous vehicles.

In accordance with an aspect of the present disclosure, there is provided an apparatus of adjusting a height of a seat belt, the apparatus including a sliding rail vertically provided on a side of a seatback and a slider including a belt ring to hang a shoulder belt, wherein the slider is engaged to the sliding rail and configured to vertically slide along the sliding rail, the belt ring being positioned on a top portion of the seatback in a state in which the slider is positioned on an upper end portion of the sliding rail.

The belt ring may be coupled to an upper end portion of the slider, and the upper end portion of the slider may slide to a position higher than the upper end portion of the sliding rail.

The apparatus may further include a cover covering the upper end portion of the sliding rail and configured to vertically slide, and the cover may be supported by the slider to vertically slide together in a predetermined co-sliding section including an uppermost position of the slider.

The apparatus may further include a downward stopper provided on a seatback frame to which the sliding rail is affixed, and the cover may be caught by the downward stopper during downward movement thereof along the co-sliding section, so that the downward movement of the cover is stopped by the downward stopper.

The apparatus may further include an upward stopper provided on a seatback frame to which the sliding rail is affixed, and the cover may be caught by the upward stopper during upward movement thereof along the co-sliding section, so that the upward movement of the cover is stopped by the upward stopper.

The apparatus may further include a spring configured to continuously exert an elastic force in a direction in which the cover moves downward.

The apparatus may further include a folding rail provided to extend from the upper end portion of the sliding rail and configured to be folded rearward of the seatback about a hinge axis located at a lower end portion of the folding rail.

The slider may be folded rearward along with the folding rail in a state in which the slider is positioned on the folding rail.

The apparatus may further include a cover covering the upper end portion of the sliding rail and the folding rail and configured to rotate rearward of the seatback about the hinge axis, and the cover may be folded rearward along with the slider and the folding rail in a state in which the slider is positioned on the folding rail.

The sliding rail may have a front open region, and a screen may be affixed to a top portion and a bottom portion of the slider to completely cover the front open region of the sliding rail.

A guide roller may be transversely connected inside the cover, the screen may include an upper screen affixed to the upper end portion of the slider, and the upper screen may extend and retract between a ceiling surface of the cover and the guide roller in response to sliding of the slider to selectively cover the open region above the slider.

The screen may include a first lower screen coupled to a lower end portion of the slider and a second lower screen provided below the first lower screen, and the first and second lower screens may move in response to sliding of the slider to cover the open region below the slider in a state in which the first lower screen overlaps a front surface of the second lower screen.

A plurality of first locks may be arranged along the sliding rail, and a second lock may be formed on the slider to engage with a corresponding one of the first locks to keep the slider at a fixed vertical position.

According to an exemplary embodiment of the present disclosure, an apparatus of adjusting the height of a seat belt has an effect of safely protecting a passenger, regardless of the body shape of a passenger, by adjusting the height of a seat belt to suit to the body shape of a passenger in a simplified manner.

Furthermore, the apparatus of adjusting the height of a seat belt may be applied not only to existing vehicle seats but also multi-functional seats of autonomous vehicles because the apparatus is provided on the side of a seatback rather than the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
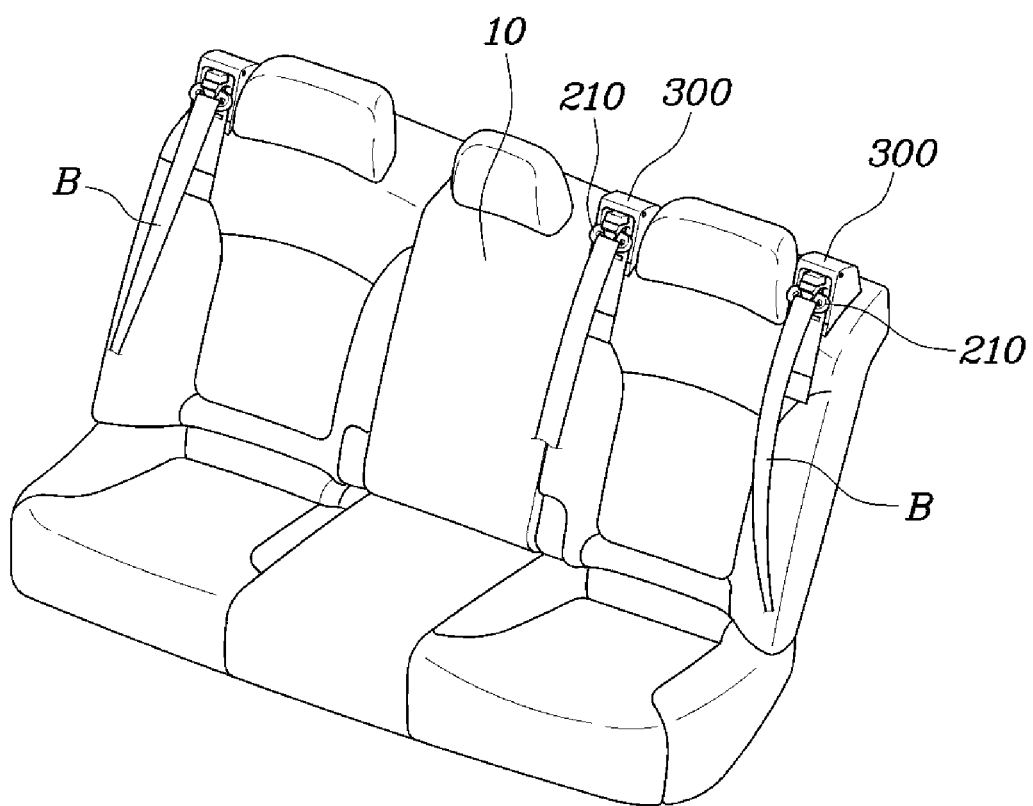
FIG. 1 is a view exemplarily illustrating a state in which an apparatus of adjusting the height of a seat belt according to an exemplary embodiment of the present disclosure is provided to a seat.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described below in detail with reference to the accompanying drawings.

Figure 2A:
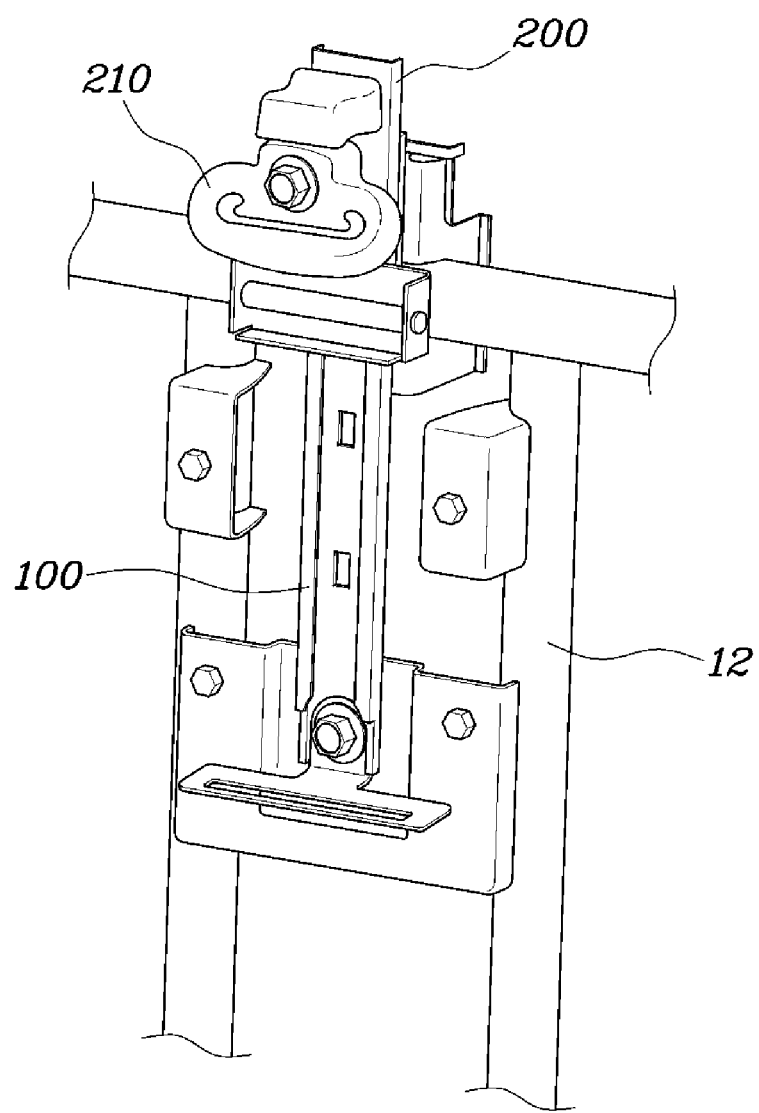
FIG. 2A and FIG. 2B are views for explaining the coupling and operational relationship between a slider and a sliding rail according to various exemplary embodiments of the present disclosure.
Figure 2B:
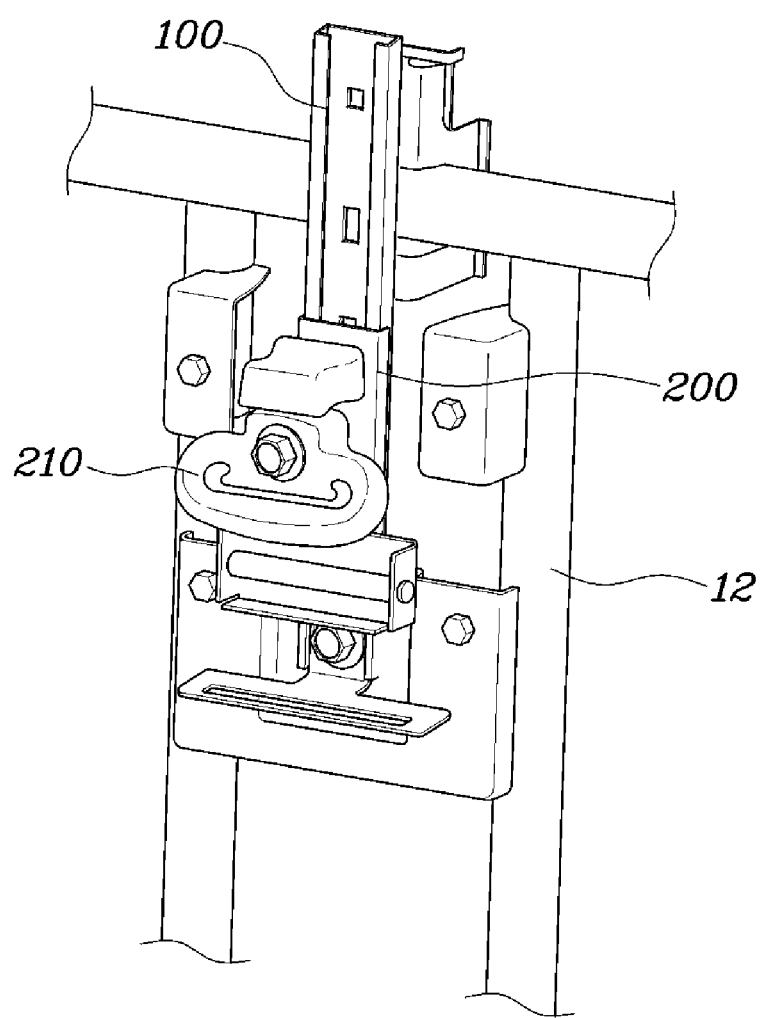

FIG. 1 is a view exemplarily illustrating a state in which an apparatus of adjusting the height of a seat belt according to an exemplary embodiment of the present disclosure is provided to a seat, and FIG. 2A and FIG. 2B are views for explaining the coupling and operational relationship between a slider 200 and a sliding rail 100 according to various exemplary embodiments of the present disclosure.

Referring to the drawings, the apparatus of adjusting the height of a seat belt of the present disclosure includes: a sliding rail 100 vertically provided on the side of a seatback 10; and a slider 200 including a belt ring 210 to hang a shoulder belt B and configured to vertically slide along the sliding rail 100, the belt ring 210 being positioned on the top portion of the seatback 10 in a state in which the slider 200 is positioned on the upper end portion of the sliding rail 100.

For example, an anchor area in which the belt ring 210 is mounted is set on the side of the seatback 10 based on the body shape of an adult passenger, and the position at which the belt ring 210 available for a child passenger is mounted needs to be set lower than the anchor area.

In view of this, the vertical length range of the sliding rail 100 is determined to satisfy not only the anchor area based on the body shape of an adult passenger but also the mounting position of the belt ring for a child passenger, and the sliding rail 100 is configured to be provided to all seats. In the case of a seat arrangement in which a center seat is placed between left and right seats as illustrated in the drawing, the sliding rail 100 may be provided to the external side of the seatback 10 for each of the left and right seats and may be provided to the left or right side of the seatback 10 for the center seat.

The sliding rail 100 described above is vertically coupled to a frame 12 of the seatback 10 which defines the structural shape of the seatback 10, and the slider 200 is provided on the front surface of the sliding rail 100 in a vertically slidable manner.

Accordingly, the belt ring 210 is coupled to the front end portion of the slider 200 so that the shoulder belt B is hung on the belt ring 210.

When the slider 200 slides to the upper end portion of the sliding rail 100, the belt ring 210 is positioned higher than the upper end portion of the sliding rail 100.

That is, the height of the belt ring 210 is lowered in a state in which the slider 200 is positioned on the lower portion of the sliding rail 100, so that the shoulder belt B is hung at a position lower than the anchor area based on the body shape of an adult passenger. Accordingly, the height of a three-point-type seat belt may be adjusted to suit to the body shape of a child passenger, which may ensure the safety of a child passenger.

On the other hand, the height of the belt ring 210 is raised in a state in which the slider 200 is positioned on the upper end portion of the sliding rail 100, so that the shoulder belt B is hung in the anchor area based on the body shape of an adult passenger. This may ensure that an adult passenger stably fastens a seat belt.

In the present way, according to an exemplary embodiment of the present disclosure, the height of a seat belt may be adjusted to suit to the body shape of a passenger in a simplified manner, which provides safe protection of a passenger regardless of the body shape of the passenger.

Moreover, because the apparatus of adjusting the height of a seat belt is provided on the side of the seatback 10 rather than the vehicle body, the apparatus may be applied not only to existing vehicle seats but also to multi-functional seats (e.g., removable-type, swivel-type, and long-sliding-type seats) of autonomous vehicles.

Referring to FIG. 2B, the belt ring 210 is coupled to the upper end portion of the slider 200, and the slider 200 slides to a position where the upper end portion of the slider 200 is positioned higher than the upper end portion of the sliding rail 100.

That is, the belt ring 210 is coupled to the upper end portion of the slider 200, so that the belt ring 210 has a height higher than the upper end portion of the sliding rail 100 when the slider 200 slides to the upper end portion of the sliding rail 100.

Accordingly, the height of the belt ring 210 to hang the shoulder belt B is raised to allow a seat belt to be raised in height and thus be available for an adult passenger. For a child passenger, the slider 200 is moved down from the upper end portion of the sliding rail 100 to reduce the height of the apparatus protruding from the top portion of the seatback 10 by the height of the slider 200, which minimizes the apparatus from blocking the driver's rear view.

Figure 3A:
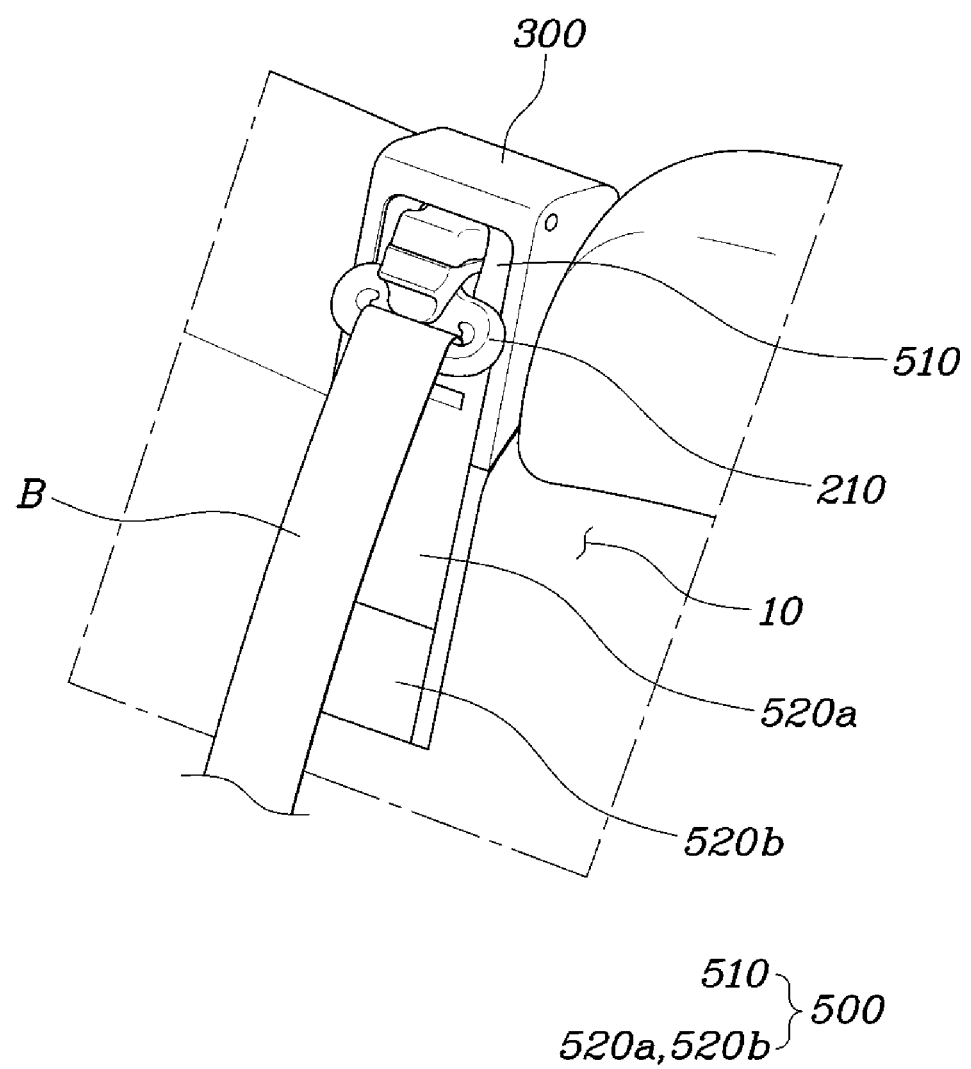
FIG. 3A, FIG. 3B, and FIG. 4 are views exemplarily illustrating the vertical sliding operational state of a cover according to the various exemplary embodiments of the present disclosure.
Figure 3B:
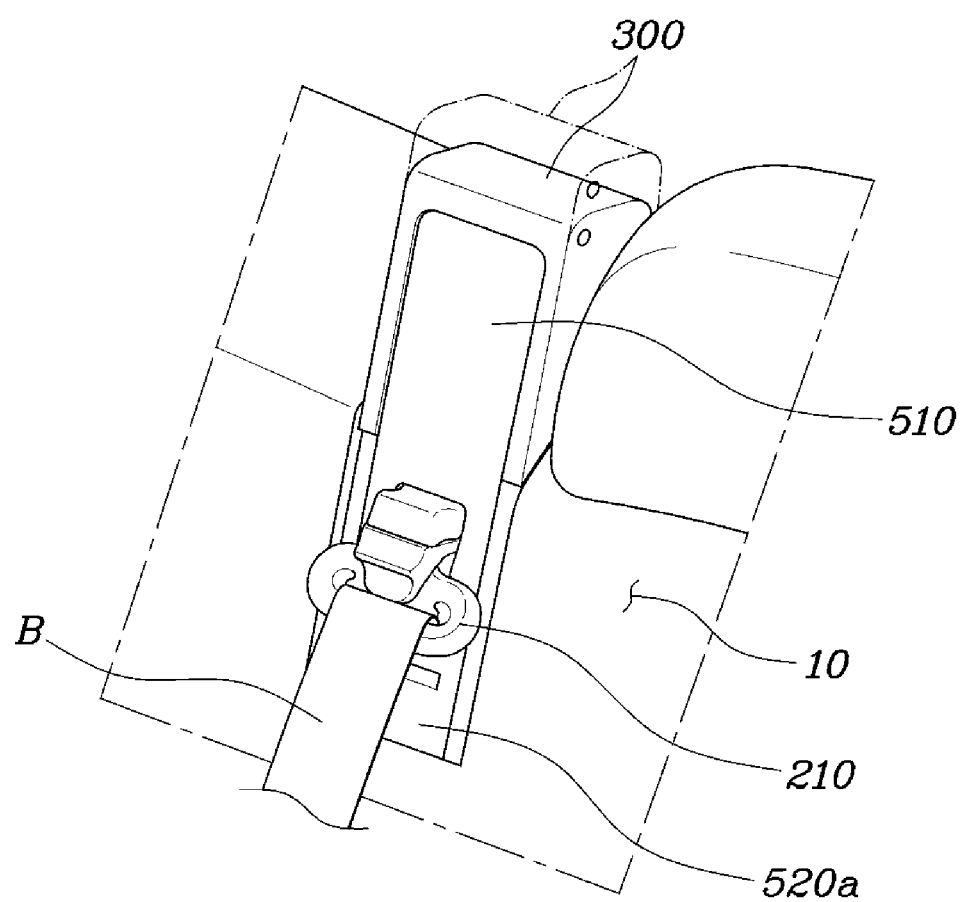
Figure 4:
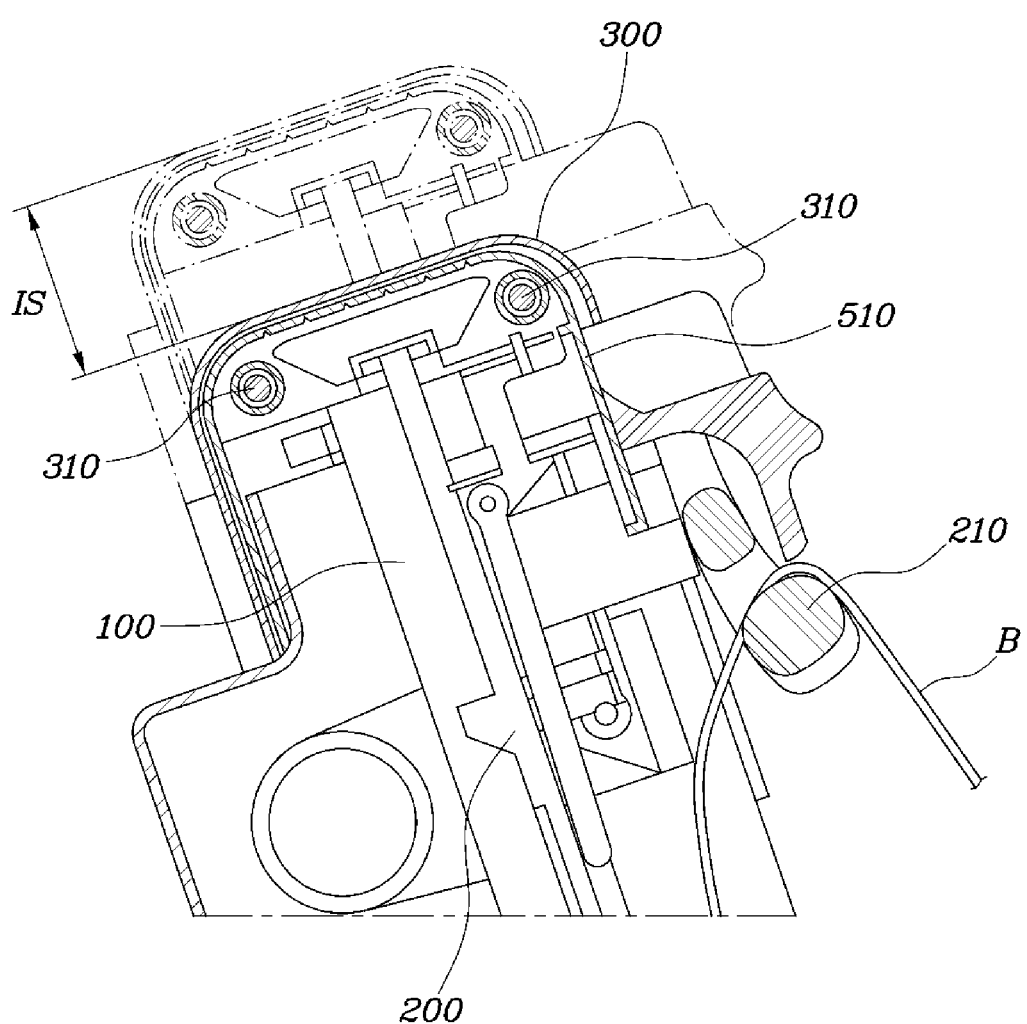
Figure 5:
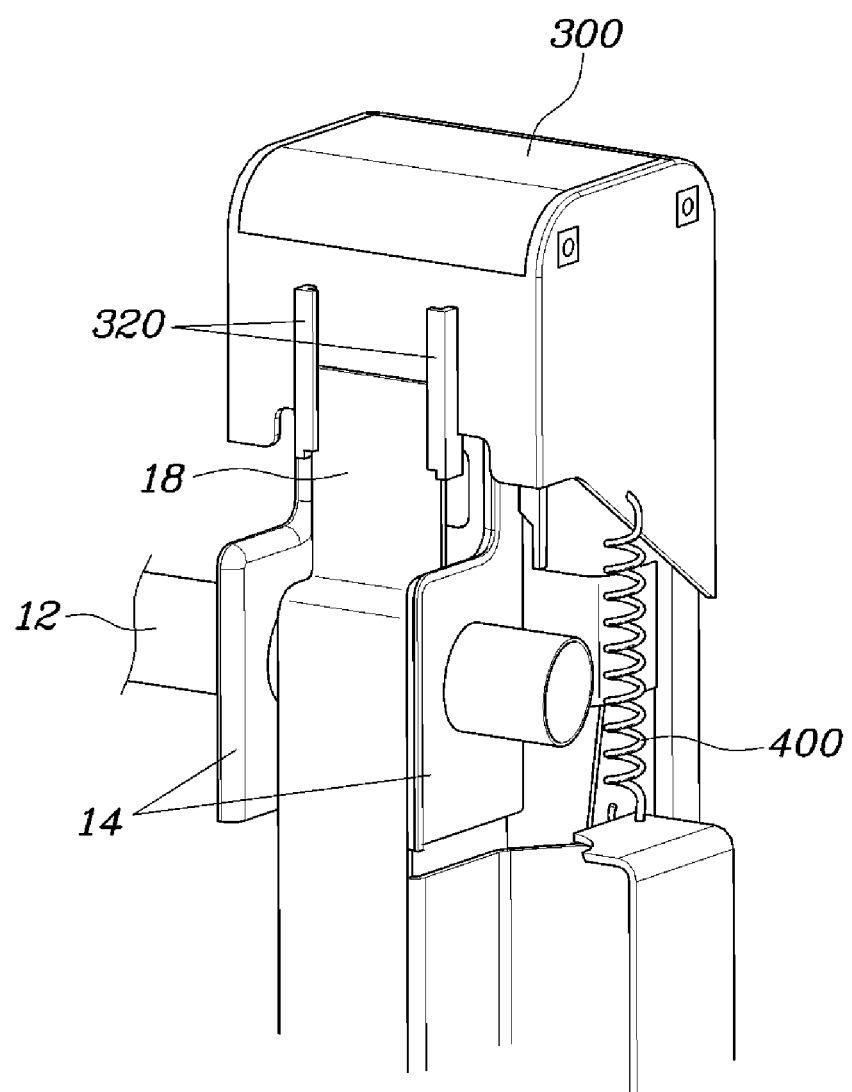
FIG. 5 is a view exemplarily illustrating the shape of the rear surface of the cover illustrated in FIG. 3.

FIGS. 3A, 3B, and 4 are views exemplarily illustrating the vertical sliding operational state of a cover 300 according to the various exemplary embodiments of the present disclosure, and FIG. 5 is a view exemplarily illustrating the shape of the rear surface of the cover 300 illustrated in FIG. 3.

Referring to the drawings, the apparatus includes the cover 300 including a shape that covers the upper end portion of the sliding rail 100 and configured to vertically slide.

The cover 300 is supported by the slider 200 to vertically slide together in a predetermined co-sliding section IS including the uppermost position of the slider 200.

That is, the upper end portion of the sliding rail 100 is closed by the cover 300 so as not to be externally exposed of the seatback 10.

A cover rail 18 is vertically provided between the sliding rail 100 and the seatback frame 12, and a pair of cover guides 320 are formed on both sides of the rear surface of the cover 300 and are guided along both sides of the cover rail 18 to guide the cover 300 to vertically slide along the cover rail 18.

Accordingly, when the slider 200 moves upwards from the lower end portion of the sliding rail 100, the slider 200 initially moves alone. Accordingly, when the slider 200 comes into contact with the cover 300 at a certain height of the sliding rail 100 in a process of moving upward, the slider 200 pushes up the cover 300, so that the slider 200 and the cover 300 move upward together to the upper end portion of the sliding rail 100.

When the slider 200 moves downwardly from the upper end portion of the sliding rail 100, the slider 200 and the cover 300 move downward together, and when the cover 300 stops at a certain height in a process of moving downward, the slider 200 moves downward alone to the lower end portion of the sliding rail 100.

That is, the slider 200 and the cover 300 move together in the co-sliding section IS which is set on the upper portion of the sliding rail 100, whereas the slider 200 moves alone in a section below the co-sliding section IS.

Figure 6:
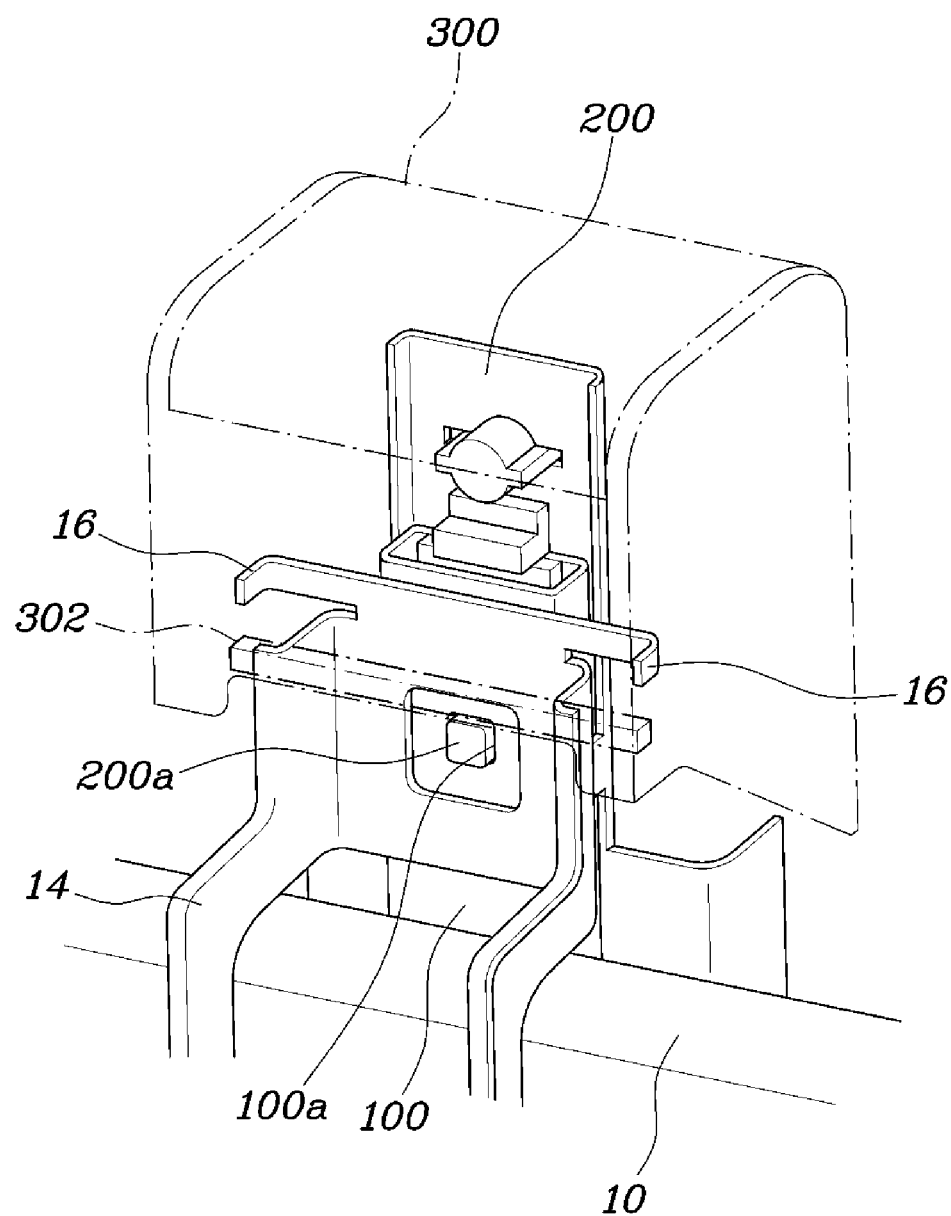
FIG. 6 is a view exemplarily illustrating a configuration for limiting the sliding section of the cover illustrated in FIG. 3.

FIG. 6 is a view exemplarily illustrating a configuration for limiting the sliding section of the cover 300 illustrated in FIG. 3.

Referring to FIG. 5 and FIG. 6, the apparatus includes a downward stopper 14 provided on the seatback frame 12 to which the sliding rail 100 is affixed, and the cover 300 is caught by the downward stopper 14 during downward movement thereof along the co-sliding section IS, so that the downward movement of the cover 300 may be stopped by the downward stopper 14.

Furthermore, the apparatus includes an upward stopper 16 provided on the seatback frame 12 to which the sliding rail 100 is affixed, and the cover 300 is caught by the upward stopper 16 during upward movement thereof along the co-sliding section IS, so that the upward movement of the cover 300 may be stopped by the upward stopper 16.

Accordingly, because the lower end portion of the cover 300 is caught by the upper surface of the downward stopper 14 and a protrusion 302, which is formed on the internal surface of the cover 300 at a position below the upper stopper 16, is caught by the lower surface of the upward stopper 16, the cover 300 is permitted to move between the downward stopper 14 and the upward stopper 16, and This prevents the excessive downward movement or upward separation of the cover 300.

Furthermore, as illustrated in FIG. 5, the apparatus of the present disclosure further includes a spring 400 which continuously exerts an elastic force in the direction in which the cover 300 moves downward.

For example, the spring 400 may be a tensile spring in a form of a coil and may have an upper end portion held by the cover 300 and a lower end portion held by the seatback frame 12.

Thus, when the slider 200 moves downwardly from the upper end portion of the sliding rail, the cover 300 is pulled down by the force of the tensile spring to thereby be moved downwards in the co-sliding section IS.

Figure 7A:
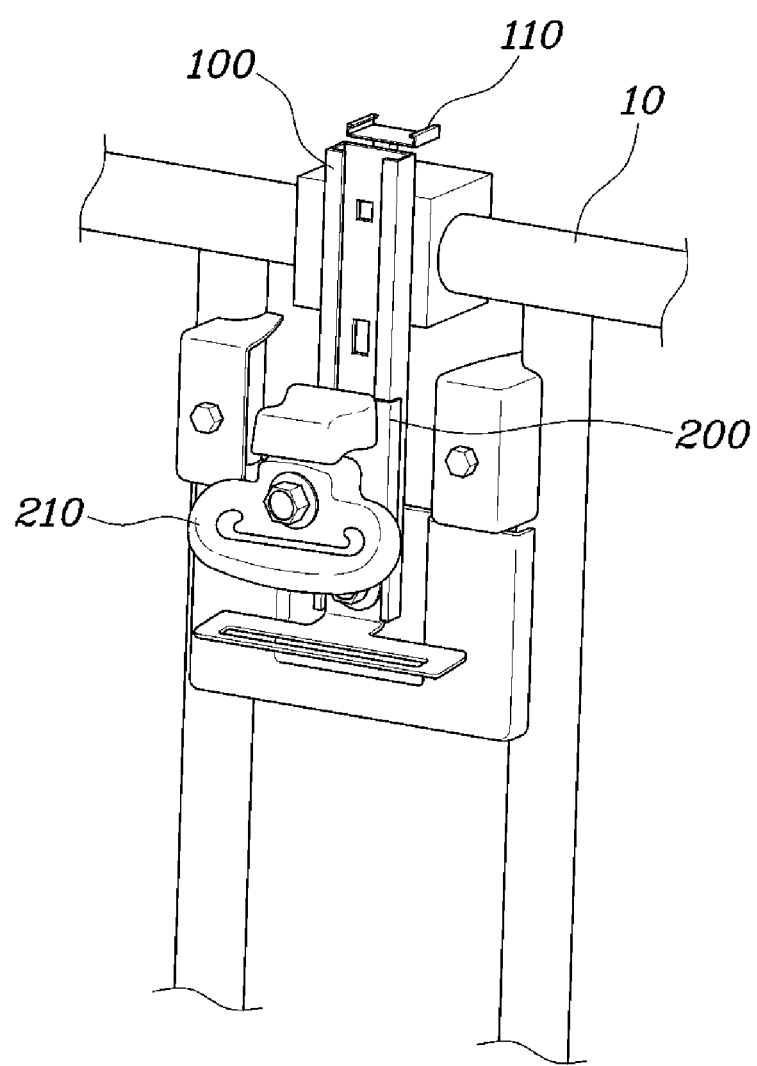
FIG. 7A, FIG. 7B, and FIG. 7C are views for explaining the coupling and operational relationship between the slider, the sliding rail and a folding rail according to various exemplary embodiments of the present disclosure.
Figure 7B:
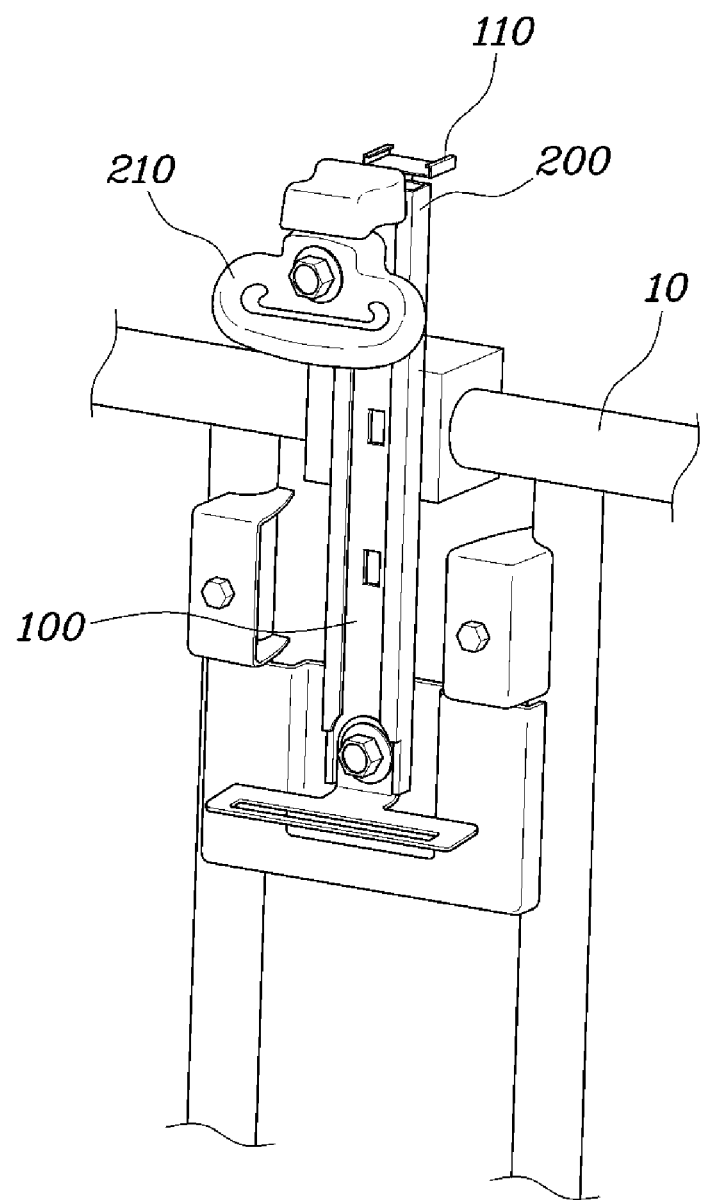
Figure 7C:
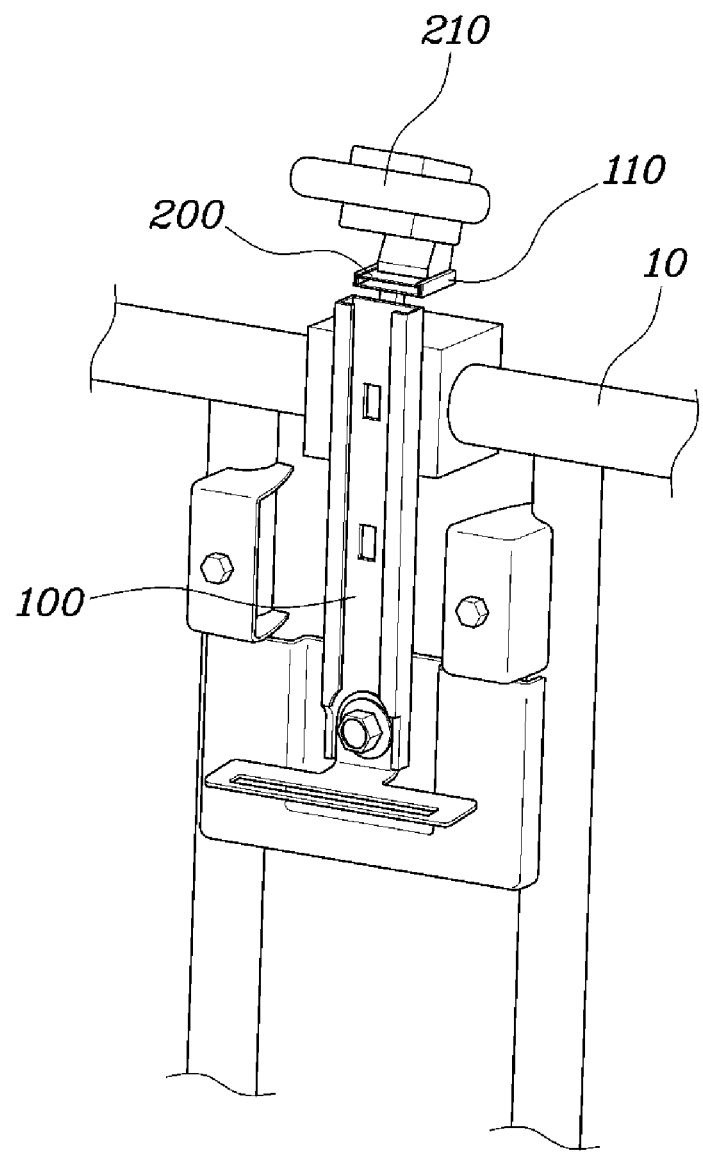
Figure 8:
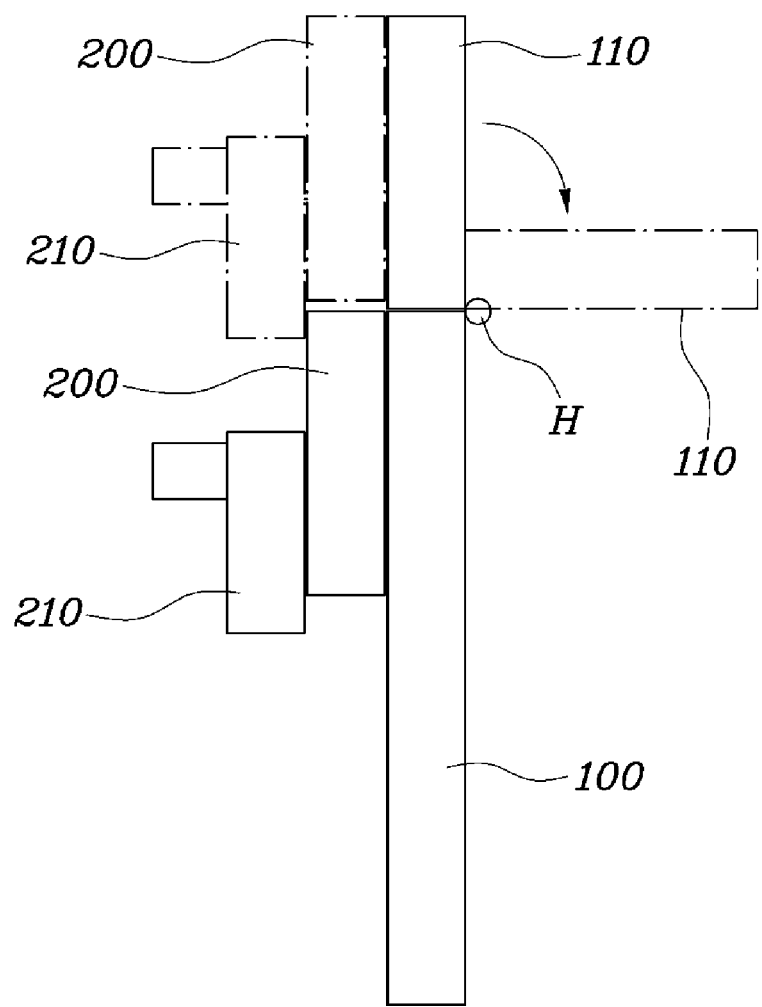
FIG. 8 is a view schematically illustrating a folding operation of the folding rail according to the various exemplary embodiments of the present disclosure.

FIG. 7A, FIG. 7B, and FIG. 7C are views for explaining the coupling and operational relationship between the slider 200, the sliding rail 100 and a folding rail 110 according to various exemplary embodiments of the present disclosure, and FIG. 8 is a view schematically illustrating a folding operation of the folding rail according to the various exemplary embodiments of the present disclosure.

Referring to the drawings, the apparatus includes the folding rail 110 provided to extend from the upper end portion of the sliding rail 100 and configured to be folded rearward of the seatback 10 about a hinge axis H at the lower end portion thereof.

That is, the folding rail 110 is folded rearward when the slider 200 is positioned on the lower portion of the sliding rail 100.

This prevents the folding rail 110 from protruding above the seatback 10 in a state in which the height of a seat belt is adjusted to suit to the body shape of a child passenger, which secures the driver's rear view.

Furthermore, as illustrated in FIGS. 7B and 7C, the slider 200 is folded rearward along with the folding rail 110 in a state in which the slider 200 is positioned on the folding rail 110.

That is, the slider 200 moves upward along the sliding rail 100 and the folding rail 110 in a state in which the folding rail 110 is unfolded upright, so that the slider 200 is positioned on the folding rail 110.

When the folding rail 110 is folded rearward in the instant state, the slider 200 positioned on the folding rail 110 is folded rearward along with the folding rail 110, and the belt ring 210 provided on the slider 200 is oriented to face upwards.

Accordingly, the folding rail 110 does not protrude above the seatback 10 even when the height of a seat belt is adjusted to suit to the body shape of an adult passenger, which secures the driver's rear view.

Figure 9A:
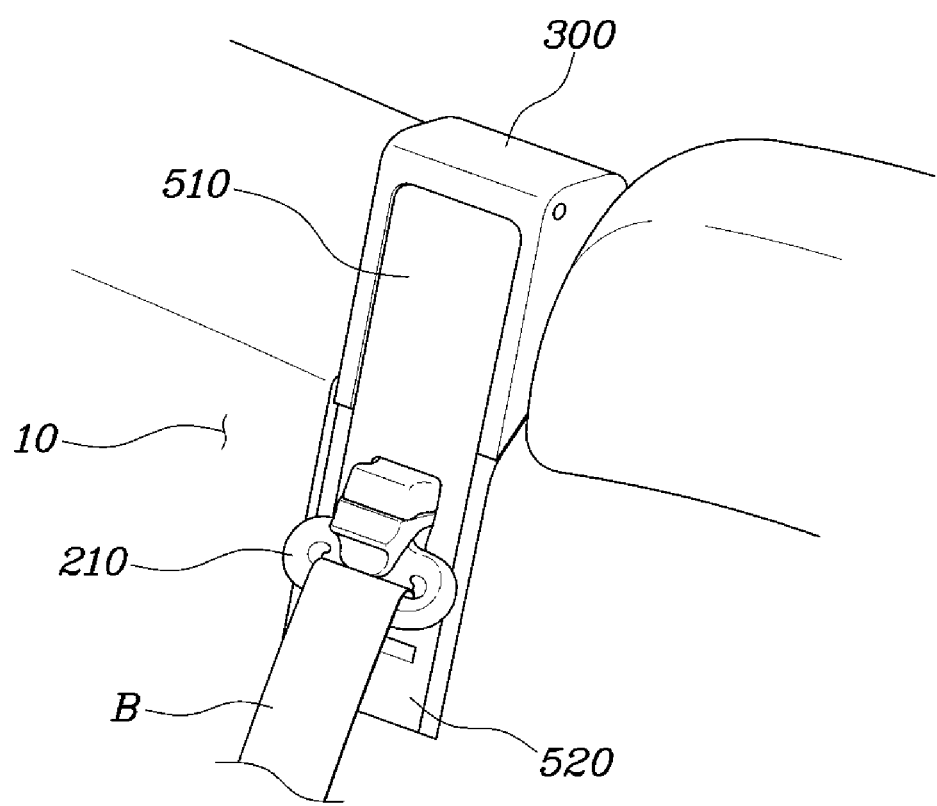
FIG. 9A, FIG. 9B, and FIG. 9C are views exemplarily illustrating the coupling of the cover with respect to the configuration of FIG. 7A, FIG. 7B, and FIG. 7C.
Figure 9B:
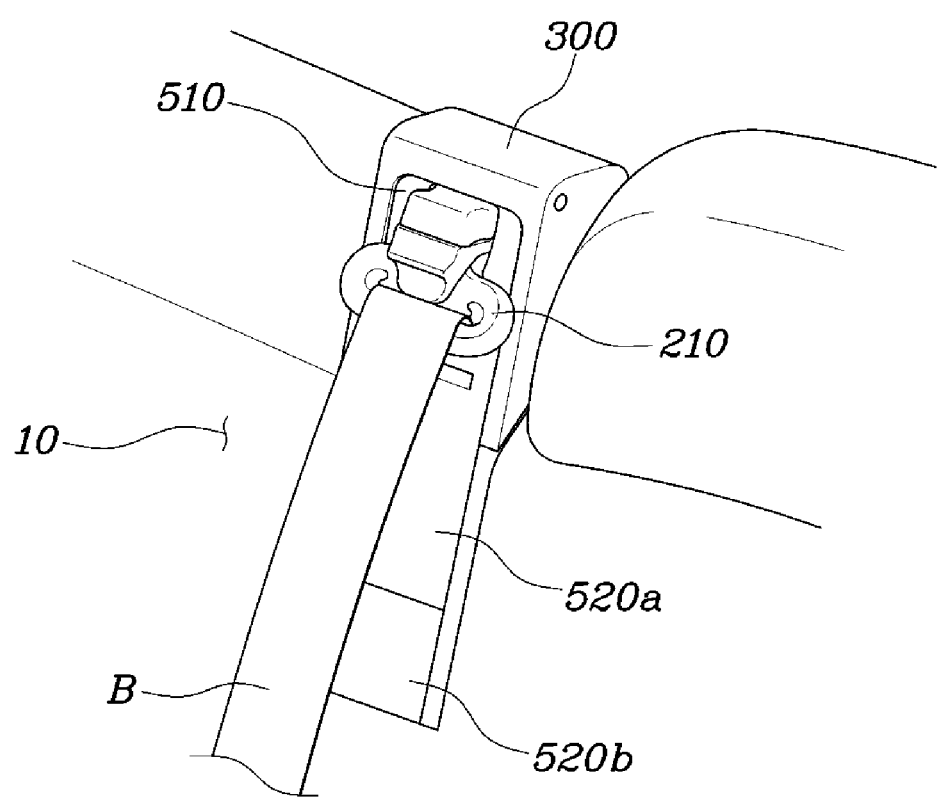
Figure 9C:
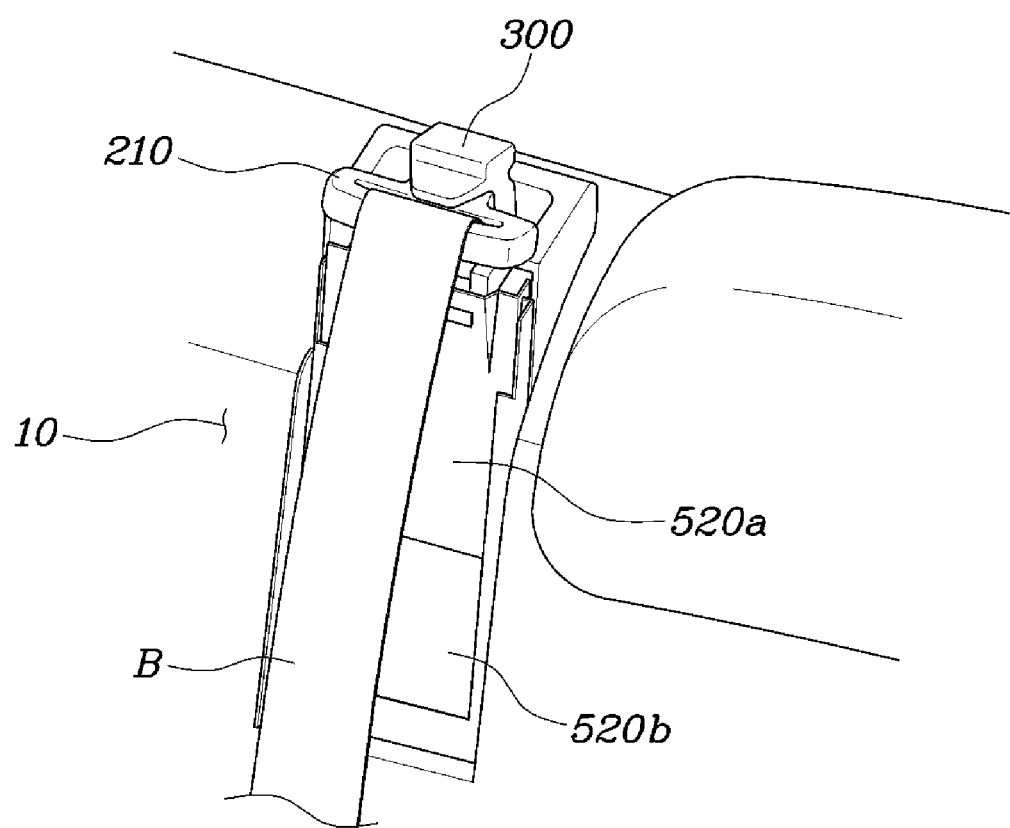

FIGS. 9A, 9B, and 9C are views exemplarily illustrating the coupling of the cover 300 with respect to the configuration of FIGS. 7A, 7B, and 7C.

Referring to the drawings, the apparatus may include the cover 300 having a shape that covers the upper end portion of the sliding rail 100 and the folding rail 110 and configured to rotate rearward of the seatback 10 about the hinge axis H.

The cover 300 is configured to be folded rearward along with the slider 200 and the folding rail 110 in a state in which the slider 200 is positioned on the folding rail 110.

Accordingly, the cover 300 closes the upper end portion of the sliding rail 100 and the folding rail 110 to prevent them from being externally exposed of the seatback 10.

The cover 300 is coupled to the folding rail 110 to thereby be folded along with the folding rail 110 in response to the folding of the folding rail 110.

That is, when the slider 200 moves upwards from the lower end portion of the sliding rail 100 and is positioned on the folding rail 110, the slider 200 is rotated rearward thereof.

Accordingly, the slider 200 and the folding rail 110 are folded rearward thereof, so that the cover 300 coupled to the folding rail 110 is also rotated rearward together, and the belt ring 210 provided on the slider 200 is oriented to face upwards.

Accordingly, the amount by which the cover 300 protrudes from the top portion of the seatback 10 is minimized in a state in which the height of a seat belt is adjusted to suit to the body shape of an adult passenger, which secures the driver's rear view.

Needless to say, the folding rail 110 may be folded rearward even when the slider 200 is positioned on the lower portion of the sliding rail 100.

Accordingly, the amount by which the cover 300 protrudes from the top portion of the seatback 10 is minimized in a state in which the height of a seat belt is adjusted to suit to the body shape of a child passenger, which secures the driver's rear view.

Furthermore, in both the configurations of the first and second exemplary embodiments of the present disclosure, the sliding rail 100 has a front open region, and a screen 500 is affixed to the top portion and bottom portion of the slider 200 to completely cover the front open region of the sliding rail 100.

That is, the screen 500 is affixed to the slider 200 and is configured to move along with the slider 200. Accordingly, the screen 500 prevents the sliding rail 100 and the folding rail 110 located above and below the slider 200 from being exposed to the outside.

The screen 500 may be divided into an upper screen 510 and a lower screen 520, and the upper screen 510 prevents the open region above the slider 200 from being exposed to the outside.

Referring to FIGS. 3A to 4, a guide roller 310 is transversely connected inside the cover 300, and the upper screen 510 is affixed to the upper end portion of the slider 200. The upper screen 510 extends and retracts between the ceiling surface of the cover 300 and the guide roller 310 in response to the sliding of the slider 200 to selectively cover the open region above the slider 200.

For example, a plurality of guide roller 310 may be provided at front and rear positions of the cover 300 to stably guide the upper screen 510.

Accordingly, when the slider 200 slides upward, the upper screen 510 is guided between the cover 300 and the guide roller 310 to pull back inside the cover 300.

In contrast, when the slider 200 slides downward, the upper screen 510 is guided between the cover 300 and the guide roller 310 to extend out of the cover 300, preventing the rail portion located above the slider 200 from being exposed to the outside.

Similarly, the lower screen prevents the open region below the slider 200 from being exposed to the outside.

A first lower screen 520a is coupled to the lower end portion of the slider 200, and a second lower screen 520b is provided below the first lower screen 520a. Both the first and second lower screens 520a and 520b move together in response to the sliding of the slider 200 to cover the open region below the slider 200 in a state in which the first lower screen 520a overlaps the front surface of the second lower screen 520b.

For example, the lower screen includes the first lower screen 520a and the second lower screen 520b, and the second lower screen 520b vertically moves at the front end portion of the first lower screen 520a.

To the present end, the first lower screen 520a may be affixed to the seatback frame 12, and the second lower screen 520b may be coupled to the slider 200 and be vertically slidable with respect to the first lower screen 520a.

Accordingly, when the slider 200 slides upward, the second lower screen 520b moves upward while being guided by the first lower screen 520a, thus covering the open region below the slider 200.

Conversely, when the slider 200 slides downward, the second lower screen 520b moves downward while being guided by the first lower screen 520a, thus covering the open region below the slider 200.

Accordingly, the rail portion located below the slider 200 is prevented from being externally exposed by the lower screen.

Referring to FIG. 6, according to an exemplary embodiment of the present disclosure, a plurality of first locks 100a are arranged along the sliding rail 100, and a second lock 200a is formed on the slider 200 to engage with a corresponding one of the first locks 100a to keep the slider 200 at a fixed vertical position.

For example, the first lock 100a may take the form of a hole, and the second lock 200a may take the form of a protrusion to be fitted into the hole.

When the second lock 200a formed on the slider 200 is fitted into the first lock 100a formed in the sliding rail 100 in a process of the slider 200 vertically sliding along the sliding rail 100, the slider 200 is fixed at the corresponding position.

This enables the position of the shoulder belt B to be adjusted in a plurality of stages, and the resulting seat belt may be adjusted in height to suit to the body shape of a passenger, and consequently be easily, conveniently and safely applied regardless of the body shape of a passenger.

Hereinafter, the operational relationship of the apparatus of adjusting the height of a seat belt according to an exemplary embodiment of the present disclosure and the actions and effects thereof will be described.

First, considering the structure of the various exemplary embodiments by way of example, when in use for a child passenger, the slider 200 needs to move downwardly in the state illustrated in FIG. 3A.

Thus, as illustrated in FIG. 3B, the slider 200 moves downward along the sliding rail 100, and at the same time with the movement of the slider 200, the cover 300 also moves downward by the force of the spring 400.

In a process of the slider 200 and the cover 300 moving together downward as described above, the cover 300 stops at the time when the cover 300 is caught by the downward stopper 14, but the slider 200 continues to move downward.

Accordingly, the slider 200 is fixed at a height suitable for the body shape of a child passenger by the engagement of the first lock 100a and the second lock 200a.

Accordingly, the height of the shoulder belt B is lowered to suit to the body shape of a child passenger and consequently, the height of a three-point-type seat belt is adjusted according to the body shape of a child passenger to safely protect a child passenger.

Furthermore, when in use for an adult passenger in a state in which the slider 200 is positioned as illustrated in FIG. 3B, the slider 200 needs to move upwards.

Thus, the slider 200 moves upward along the sliding rail 100 as illustrated in FIG. 3A.

In the present process, the slider 200 pushes up the cover 300 when it comes into contact with the cover 300, so that the slider 200 and the cover 300 move upward together.

Accordingly, the slider 200 is fixed at a height suitable for the body shape of an adult passenger, for example, at the upper end portion of the sliding rail 100 by the engagement of the first lock 100a and the second lock 200a.

Accordingly, the height of the shoulder belt B is raised to suit to the body shape of an adult passenger and consequently, the height of a three-point-type seat belt is adjusted according to the body shape of an adult passenger to safely protect not only a child passenger but also an adult passenger.

Next, considering the structure of the various exemplary embodiments by way of example, when in use for a child passenger, the cover 300, which is folded rearward as illustrated in FIGS. 7C and 9C, is rotated forward to be erected upright.

Accordingly, as illustrated in FIG. 9B, the slider 200 and the folding rail 110 inside the cover 300 are erected together.

When the slider 200 moves downwardly in the instant state, as illustrated in FIG. 9A, the slider 200 is separated from the folding rail 110 and moves downward along the sliding rail 100.

Accordingly, the slider 200 is fixed at a height suitable for the body shape of a child passenger by the engagement of the first lock 100a and the second lock 200a.

Accordingly, the height of the shoulder belt B is lowered to suit to the body shape of a child passenger and consequently, the height of a three-point-type seat belt is adjusted according to the body shape of a child passenger to safely protect a child passenger.

For reference, when the cover 300 is rotated rearward in the state illustrated in FIG. 9A, the folding rail 110 is folded rearward along with the cover 300 as illustrated in FIG. 7A. This may reduce the amount by which the cover 300 protrudes from the top portion of the seatback 10.

On the other hand, when in use for an adult passenger in a state in which the height of the shoulder belt B is lowered to suit to the body shape of a child passenger, the cover 300, which is folded rearward in the state as illustrated in FIG. 7A, is rotated forward to be erected upright.

Accordingly, the folding rail 110 inside the cover 300 is erected along with the cover 300 as illustrated in FIG. 8 (here, note that FIG. 7B illustrates a state before the folding rail 110 is erected).

In the present state, by moving the slider 200 upward along the sliding rail 100 and the folding rail 110, the slider 200 is positioned on the folding rail 110.

Accordingly, the slider 200 is fixed at a height suitable for the body shape of an adult passenger, for example, at the upper end portion of the folding rail 110 by the engagement of the first lock 100a and the second lock 200a.

When the cover 300 is rotated rearward in the instant state, the slider 200 and the internal folding rail 110 inside the cover 300 are folded rearward together as illustrated in FIG. 7C.

Accordingly, the height of the shoulder belt B is raised to suit to the body shape of an adult passenger and consequently, the height of a three-point-type seat belt is adjusted according to the body shape of an adult passenger to safely protect not only a child passenger but also an adult passenger.

As described above, according to an exemplary embodiment of the present disclosure, it is possible to safely protect a passenger regardless of the body shape of a passenger by adjusting the height of a seat belt to suit to the body shape of a passenger in a simplified manner.

Furthermore, it is possible to apply the apparatus not only to existing vehicle seats but also multi-functional seats (e.g., removable-type, swivel-type, and long-sliding-type seats) of autonomous vehicles because the apparatus is provided on the side of the seatback 10 rather than the vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of adjusting a height of a seat belt, the apparatus comprising:
 a sliding rail vertically provided on a side of a seatback; and
 a slider including a belt ring to hang a shoulder belt,
  wherein the slider is engaged to the sliding rail and configured to vertically slide along the sliding rail, the belt ring being positioned on a top portion of the seatback in a state in which the slider is positioned on an upper end portion of the sliding rail, wherein the belt ring is coupled to an upper end portion of the slider, and wherein the upper end portion of the slider is configured to slide to a position higher than the upper end portion of the sliding rail.

2. The apparatus of claim 1, further including:

a cover covering the upper end portion of the sliding rail and configured to vertically slide, wherein the cover is supported by the slider to vertically slide with the slider in a predetermined co-sliding section including an uppermost position of the slider.

3. The apparatus of claim 2, further including:

a downward stopper provided on a seatback frame to which the sliding rail is affixed, wherein the cover is caught by the downward stopper during downward movement of the cover along the co-sliding section, so that the downward movement of the cover is stopped by the downward stopper.

4. The apparatus of claim 2, further including:

an upward stopper provided on a seatback frame to which the sliding rail is affixed, wherein the cover is caught by the upward stopper during upward movement of the cover along the co-sliding section, so that the upward movement of the cover is stopped by the upward stopper.

5. The apparatus of claim 4, wherein the cover includes a protrusion formed on an internal surface of the cover at a position below the upper stropper to be selectively caught by a lower surface of the upward stopper.

6. The apparatus of claim 2, further including:

a spring configured to continuously exert an elastic force in a direction in which the cover moves downward.

7. The apparatus of claim 5, wherein an upper end portion of a spring is coupled to the cover and a lower end portion of the spring is coupled to a seatback frame.

8. The apparatus of claim 1, further including:

a folding rail provided to extend from the upper end portion of the sliding rail and configured to be folded rearward of the seatback about a hinge axis located at a lower end portion of the folding rail.

9. The apparatus of claim 8, wherein the slider is foldable rearward along with the folding rail in a state in which the slider is positioned on the folding rail.

10. The apparatus of claim 8, further including:

a cover covering the upper end portion of the sliding rail and the folding rail and configured to rotate rearward of the seatback about the hinge axis, wherein the cover is folded rearward along with the slider and the folding rail in a state in which the slider is positioned on the folding rail.

11. The apparatus of claim 2, wherein the sliding rail has a front open region, and wherein a screen is affixed to a top portion and a bottom portion of the slider to cover the front open region of the sliding rail.

12. The apparatus of claim 11, wherein a guide roller is transversely connected inside the cover, wherein the screen includes an upper screen affixed to an upper end portion of the slider, and wherein the upper screen extends and retracts between a ceiling surface of the cover and the guide roller in response to sliding of the slider to cover the front open region above the slider.

13. The apparatus of claim 11, wherein the screen includes a first lower screen coupled to a lower end portion of the slider, and a second lower screen provided below the first lower screen, and wherein the first and second lower screens move in response to sliding of the slider to cover the front open region below the slider in a state in which the first lower screen overlaps a front surface of the second lower screen.

14. The apparatus of claim 1, wherein a plurality of first locks is disposed along the sliding rail, and wherein a second lock is formed on the slider to engage with a corresponding one of the first locks to keep the slider at a fixed vertical position.

15. The apparatus of claim 10, wherein the sliding rail has a front open region, and wherein a screen is affixed to a top portion and a bottom portion of the slider to cover the front open region of the sliding rail.

* * * * *